(No Model.) 5 Sheets—Sheet 1.
O. C. BAUER.
DUMPING CAR.
No. 591,585. Patented Oct. 12, 1897.
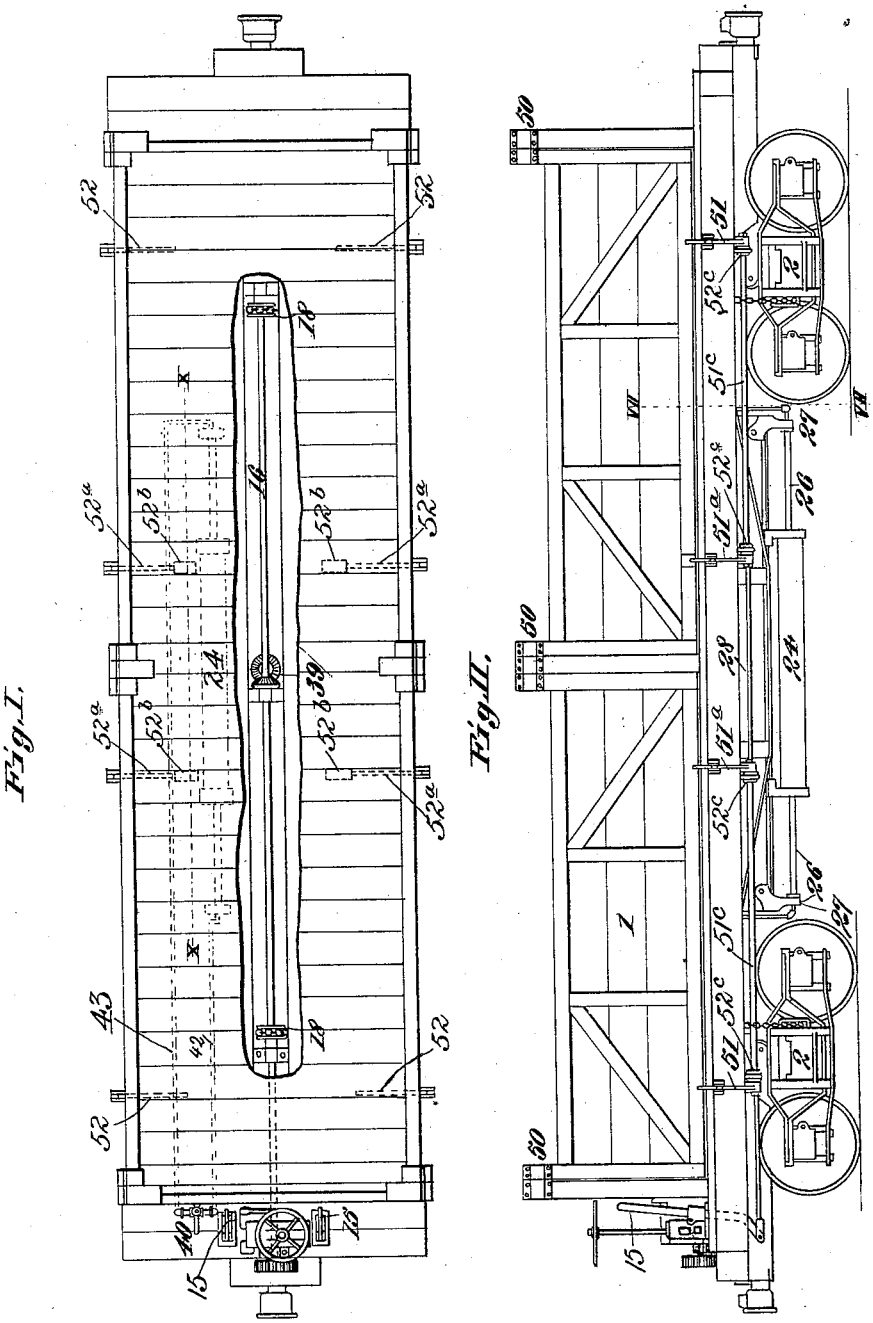
Attest:
A. M. Parkins.
F. O. McCleary.
Inventor:
Otto C. Bauer.
By Annie R. Goldsborough,
Attys (No Model.)  5 Sheets—Sheet 2.
O. C. BAUER.
DUMPING CAR.
No. 591,585.  Patented Oct. 12, 1897.
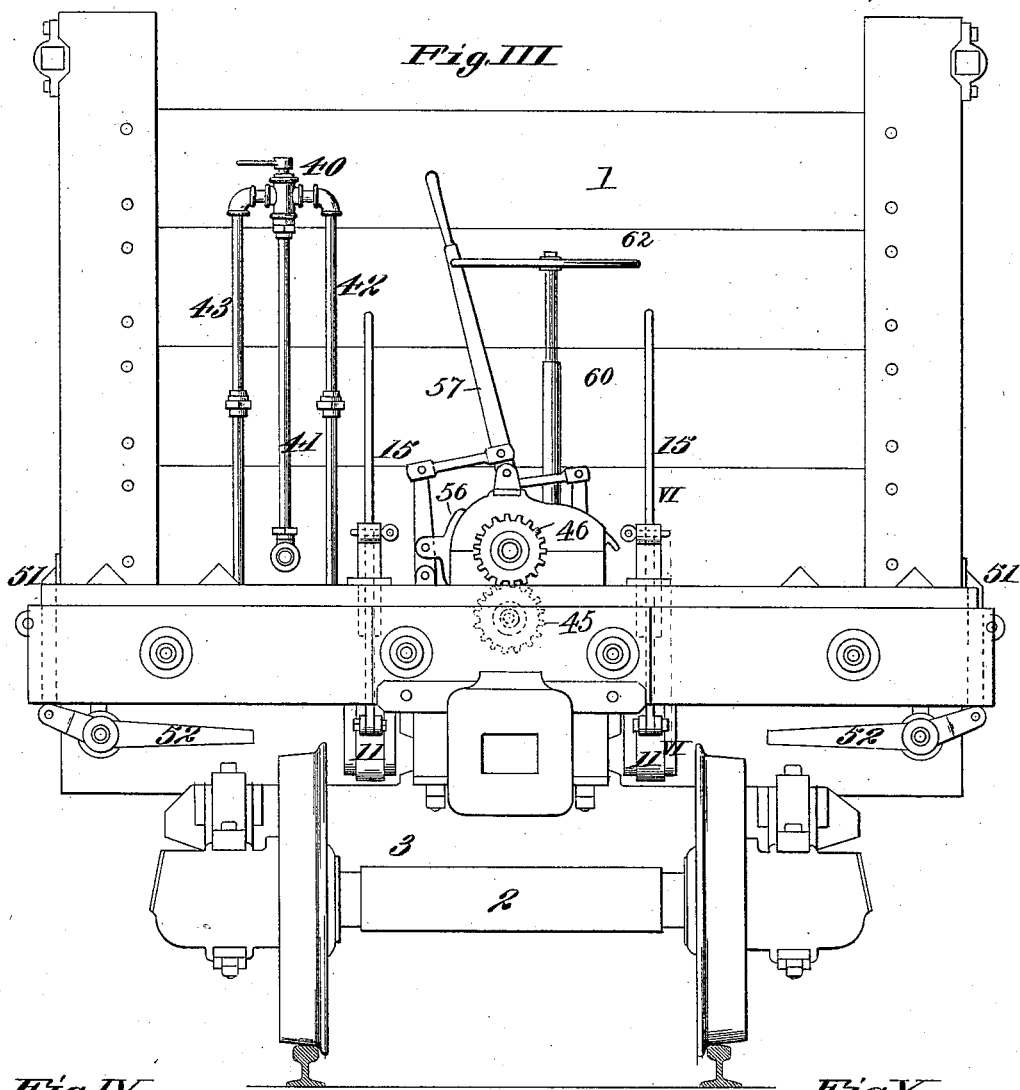
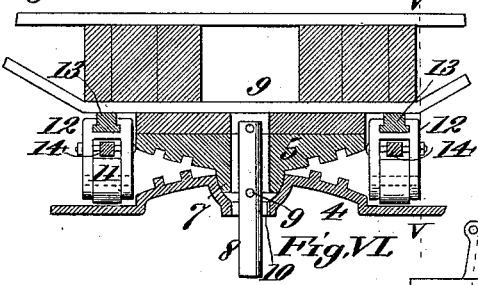
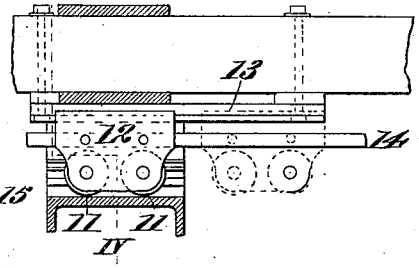
Attest:
A. M. Parkins
F. M. Cleary
Inventor:
Otto C. Bauer.
By Bauer & Goldsborough,
Attys
THE NORRIS PETERS CO., PHOTO-LITHO., WASHINGTON, D. C.

(No Model.) 5 Sheets—Sheet 3.
O. C. BAUER.
DUMPING CAR.
No. 591,585. Patented Oct. 12, 1897.
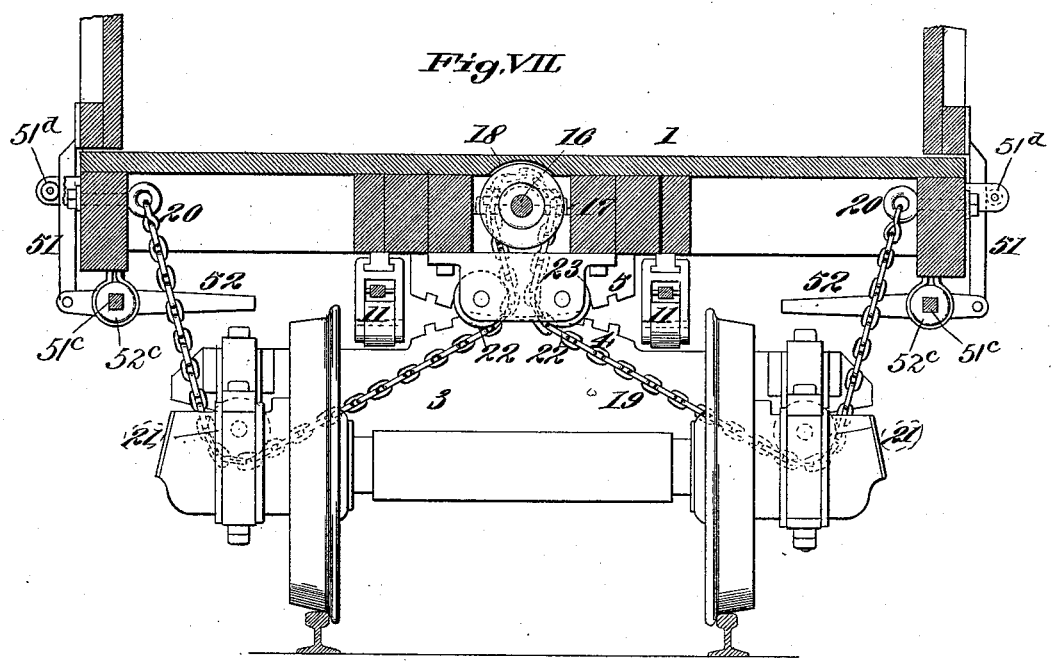
Fig. VII
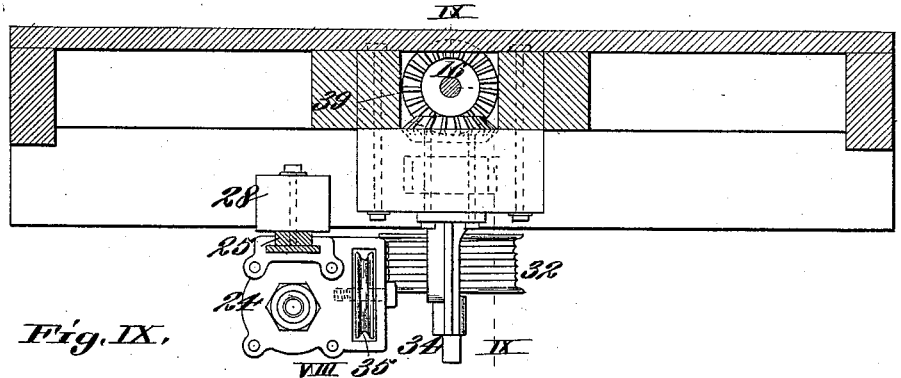
Fig. VIII.
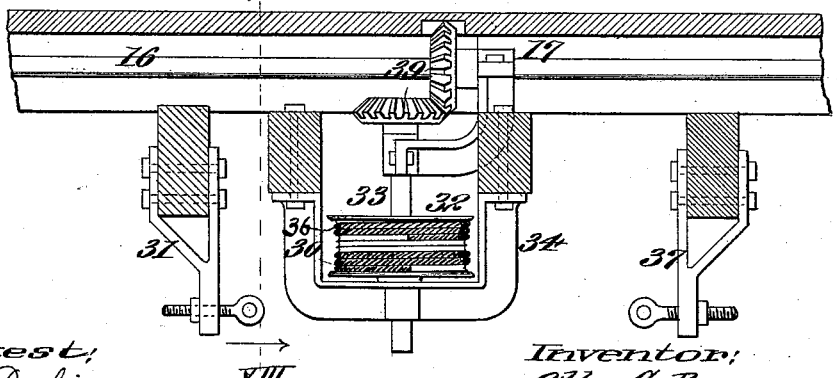
Fig. IX.
Attest:
A. M. Parkins
F. D. McCleary
Inventor:
Otto C. Bauer (No Model.) 5 Sheets—Sheet 4.
O. C. BAUER.
DUMPING CAR.
No. 591,585. Patented Oct. 12, 1897.
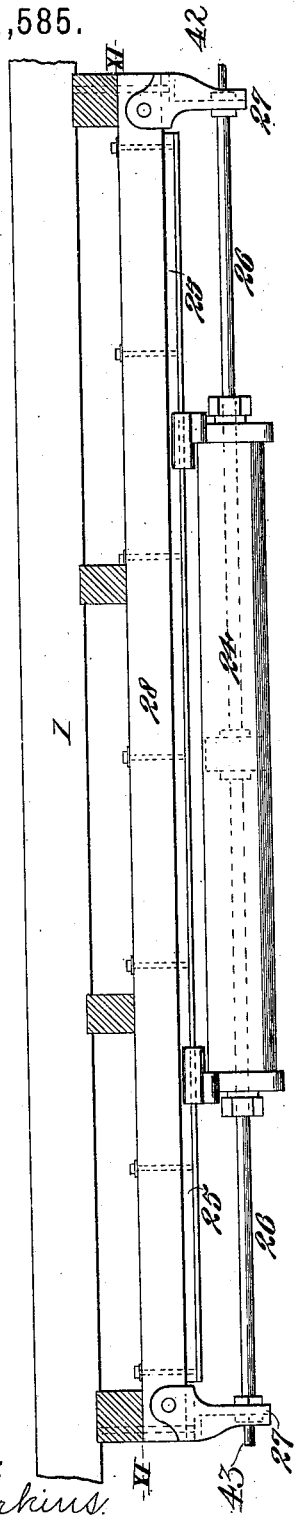
Fig. X.
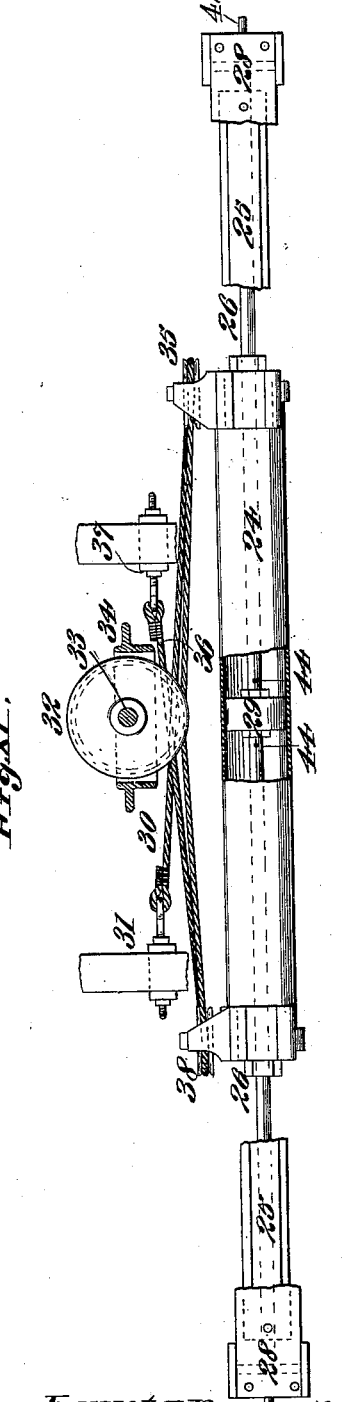
Fig. XI.
Attest:
A. M. Parkins.
J. O. W. Cleary.
Inventor
Otto C. Bauer
By Hennie & Goldsborough,
attys.

(No Model.)  5 Sheets—Sheet 5.
O. C. BAUER.
DUMPING CAR.
No. 591,585. Patented Oct. 12, 1897.
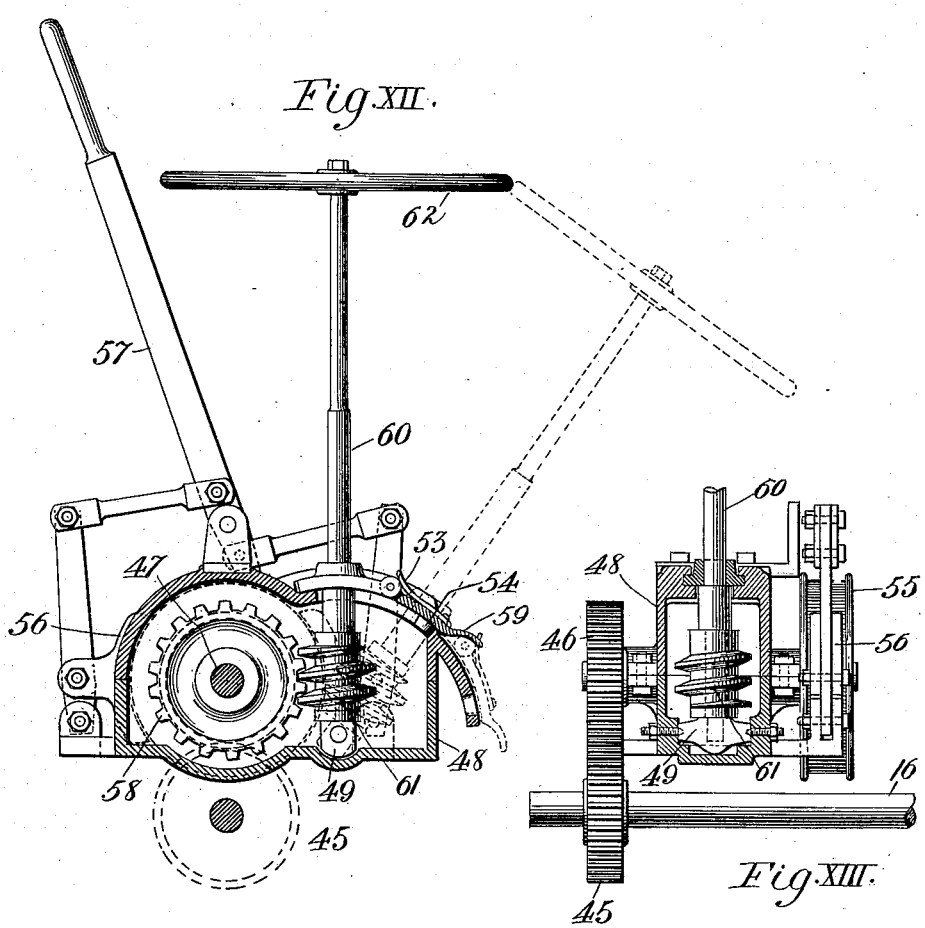
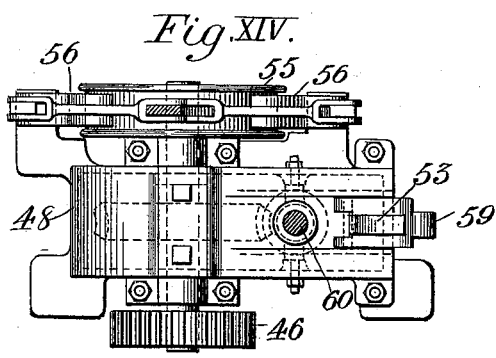
Attest:
A. M. Parkins.
J. O. McCleary.
Inventor:
Otto C. Bauer,
by Jennie Goldsborough,
Attys.

UNITED STATES PATENT OFFICE.

OTTO C. BAUER, OF ST. LOUIS, MISSOURI, ASSIGNOR TO THE MISSOURI CAR AND FOUNDRY COMPANY, OF SAME PLACE.

DUMPING-CAR.

SPECIFICATION forming part of Letters Patent No. 591,585, dated October 12, 1897.

Application filed April 6, 1897. Serial No. 631,009. (No model.)

*To all whom it may concern:*

Be it known that I, OTTO C. BAUER, a citizen of the United States, residing at St. Louis, in the State of Missouri, have invented certain new and useful Improvements in Dumping-Cars; and I do hereby declare the following to be a full, clear, and exact description of the invention, such as will enable others skilled in the art to which it appertains to make and use the same.

My invention relates particularly to that class of dumping-cars wherein the dumping-gear is actuated primarily from a suitable source of fluid-pressure supply. Prior to my invention, so far as I am aware, no provision has been made for dumping such power-operated cars in the event of failure or exhaustion of the fluid-pressure, which is liable to occur unexpectedly from various causes. Consequently the operator is frequently in the embarrassing dilemma of being unable to dump the car through the instrumentality of the fluid-pressure motive power and of having no means at hand to meet the emergency.

The main purpose of my present invention is to supply this deficiency by associating with the fluid-pressure mechanism manually-operated mechanism, both of which are adapted to actuate the dumping-gear, the relationship between the two being such that the manually-operated device (which in the form illustrated herein is out of engagement with the dumping-gear during the period of effective action of the fluid-pressure mechanism) may, upon failure of the fluid-pressure, be thrown into engagement with said gear and operated to dump the car by hand without disconnecting the fluid-pressure mechanism. Cars equipped with my improvements are, therefore, normally fully under the control of the fluid-pressure mechanism, but in case of emergency can be rendered entirely independent thereof.

My invention relates also to further features of improvement useful in the construction and organization of dumping-cars, as hereinafter described, and particularly pointed out in the claims.

In the accompanying drawings, Figure I is a top or plan view of a car embodying my improvements. Fig. II is a side elevation thereof. Fig. III is an end view. Fig. IV is a detail vertical transverse section taken on the line IV IV, Fig. V. Fig. V is a detail vertical longitudinal section taken on the line V V, Fig. IV. Fig. VI is a detail vertical longitudinal section taken on the line VI VI, Fig. III. Fig. VII is an enlarged vertical transverse section taken on the line VII VII, Fig. II. Fig. VIII is a vertical transverse section taken on the line VIII VIII, Fig. IX. Fig. IX is a detail vertical longitudinal section taken on the line IX IX, Fig. VIII. Fig. X is an enlarged detail vertical section taken on the line X X, Fig. I. Fig. XI is a detail horizontal section taken on the line XI XI, Fig. X. Fig. XII is an end view, partly in section, of the hand-operated mechanism and friction-brake. Fig. XIII is a side view thereof, partly in section and partly broken away. Fig. XIV is a top plan view thereof, the operating-rods being shown in section.

Similar numerals of reference indicate similar parts throughout the several views.

Referring to the drawings, 1 represents a car-body, and 2 the trucks. The body has a rocking bearing on the bolsters 3 of the trucks by means of racks 4 on the bolsters, which mesh with racks 5, secured to the under side of the car-body, as seen in Figs. IV and VII. These intermeshing racks keep the car-body from slipping when dumping, and a ball-and-socket bearing 7 between the racks on the car-body and those on the trucks permits the trucks to swivel freely with respect to the car-body.

8 represents king-bolts secured to the upper racks 5 by means of transverse pins 9, said king-bolts passing through suitable apertures 10 in the lower racks 4.

When the car is being loaded and transported, the body is held from rocking by means of rollers 11, journaled in boxes 12, supported from the bottom of the car by slides 13.

14 represents rods connected to the boxes 12. These rods extend to one end of the car, where they are made fast to levers 15, pivoted to the car-platform. (See Figs. III and VI.) When the car is being loaded and transported, the boxes are between the car-body and the bolsters, as shown by full lines in Fig. V, and when the car is to be dumped toward the one side or the other, as the case may be, the boxes on the dumping side of the car are drawn back to the position shown in dotted lines, Fig. V, by means of the corresponding levers 15, the boxes thus being removed from between the car-body and the bolster, so that the car-body can be dumped.

A dumping-shaft 16 extends longitudinally of the car-body and is supported by the journal-boxes 17. This shaft has a chain-wheel 18 near each end of the car, over which pass the chains 19, made fast at their ends to the car-body, as shown at 20, Fig. VII. The chains pass under pulleys 21, secured to the ends of the bolsters, (see Figs. II and VII,) and they also pass under pulleys 22, journaled in castings 23, secured to the car-body.

The dumping-shaft 16 is designed normally to be rotated by fluid-pressure—as, for instance, compressed air—supplied to a sliding cylinder 24, having closed ends and suspended from a slide 25, attached to a beam 28 of the car. Passing through the cylinder and mounted in hangers 27 is a stationary hollow piston-rod 26, bearing the piston-head 29 and having ports 44 on opposite sides of the piston-head. It will of course be understood that these two ports must not communicate with each other through the hollow piston-rod. To this end a suitable plug or partition may be inserted in that part of the hollow piston-rod which passes through the piston-head, or the hollow piston-rod may be made in two parts connected by the piston-head, but between which internal communication is cut off by the piston-head itself.

From one end of the hollow piston-rod extends a pipe 43 and from the opposite end a pipe 42, said pipes being adapted to be alternately placed in communication with a supply-pipe 41 for compressed air or other fluid under pressure, according as it is desired to drive the cylinder in one direction or the other. An appropriate multiway valve 40 governs the admission of the fluid into the one pipe or the other.

The preferred means for transmitting the motive power of the cylinder to the dumping-shaft are as follows: 30 represents a rope or cable one end of which is made fast to a hanger 31, depending from the car-body, and the other end of which is made fast to one side of a grooved drum 32 on a shaft 33, journaled in a frame 34, secured to the car-body. This cable 30 passes over a pulley 35, journaled to one end of the cylinder 24.

36 represents a second cable secured by one end to a hanger 37, depending from the car-body, and the other end of which is made fast to the opposite side of the drum 32 from the side at which the cable 30 is secured. This cable passes over a pulley 38, secured to the opposite end of the cylinder 24 from that to which the pulley 35 is secured. The shaft 33 has a bevel-gear connection 39 with the shaft 16. (See Fig. IX.) It will thus be seen that the movement of the cylinder will revolve the drum 32 and the movement of the drum will be transmitted to the shaft 16, thereby causing the car-body to be rocked in accordance with the direction in which the cylinder moves.

To provide against emergencies of failure of the fluid-pressure supply, the dumping-shaft is extended to one end of the car and is provided thereat with a pinion 45, which meshes with a pinion 46 upon a worm-wheel shaft 47. The worm-wheel 58 upon said shaft is contained within a two-part casing 48, provided for protecting it from injury and from dust and dirt, and also for containing, if need be, a body of oil within which the worm-wheel may dip, so as to be constantly lubricated. In the casing is mounted a rocking bearing 49, within which is stepped to rotate freely the lower end of the spindle 60, carrying the worm 61 and adapted to be operated by the hand-wheel 62. The casing is slotted to permit the worm to be rocked forward into engagement with the worm-wheel, as shown in full lines in Fig. XII, or to be retracted out of engagement, as shown in dotted lines in said figure. A casting having a spring 53, lug 54, and releasing-lip 59 serves as a spring-catch to lock or retain the worm in either position of adjustment.

Upon the worm-wheel shaft 47 is mounted a friction disk or drum 55, with which coöperate the friction-shoes 56, connected by swinging links, as shown, to the pivoted operating-bar 57.

When the power-cylinder is employed for actuating the dumping-shaft, the retaining-casting should be raised and the worm-spindle thrown back into the position shown in dotted lines in Fig. XII, as otherwise it would lock the dumping-shaft against rotation by the power-cylinder. When the worm is thus out of gear with the worm-wheel and when the supply of compressed air or other fluid to the power-cylinder fails, the car may be dumped by gravity, the velocity of descent being controlled by the friction-brake. Where this is not practicable or desirable, the worm is thrown forward into engagement with the worm-wheel and held therein by the retaining-casting, and by turning the hand-wheel to the right or left the car may be dumped as slowly as desired and no faster than the wheel is turned. The fluid-pressure mechanism in no wise interferes with the operation of the manually-operated mechanism, but moves idly in accordance therewith, the application of the two kinds of mechanism to the same dumping-shaft being entirely appropriate and harmonious.

In the car illustrated in the drawings the sides are hinged at 50, and in order to keep them closed until the car has reached its intended dumping position latch-bars 51, pivoted to levers 52, are provided, the free ends of which levers strike the truck at the appropriate period when the car is dumped and retract the latch-bars, so that the side can swing open upon its hinges. Further along, toward a point midway of the length of the car, are arranged similar latches 51ª, mounted upon latch-levers 52ª, having cast upon their ends weights 52ᵇ, as indicated in dotted lines in Fig. 1. Prior to my invention it has been customary to connect the latch-levers 52 and 52ª by a round rod having its bearings in eyebolts secured to the side sills of the car, but unless the rod was made of very large size it would twist, and as a consequence the latch 51 would release its end of the swinging side of the car, while the gravity latch 51ª would remain in place and would require to be knocked out or released by hand, thereby destroying the automatic character of the mechanism. To provide against this disadvantage, I make the connecting-rod 51ᶜ square in cross-section (see Fig. VII) and provide the latch-levers 52 and 52ª with cast bearings 52ᶜ, having square apertures for receiving the square rod 51ᶜ. The cast bearings 52ᶜ are provided with a circumferential groove or recess for the reception of an encircling round iron, forming an eyebolt, secured to the bottom of the side sills of the car and within which the bearing is adapted to turn freely. As the result of this construction the connection between the latch-levers 52 and the gravity latch-levers 52ª is stiff and rigid, so that any motion imparted to the latch-levers 52 will be instantly transmitted to the latch-levers 52ª, thereby allowing the hinged side of the car to open up at both ends at exactly the same time and with an easy and free motion insured by the character of the bearings.

In order to allow the latch-bolts 51 and 51ª to move more freely and to release themselves more readily from engagement with the lower ends of the hinged sides of the car, I interpose between the rear edges of the latches and the guides within which the latches move a roller 51ᵈ, said roller being held in place by a rivet, upon which it revolves freely, thereby permitting the latch to work easily however great the pressure may be upon the gates, and consequently against the latches themselves.

Having thus described my invention, what I claim is—

1. In a dumping-car, the combination with the car-body, of dumping-gear therefor, a power-cylinder operatively connected with the dumping-gear, and auxiliary hand-operated mechanism for actuating the dumping-gear should the power-cylinder fail.

2. In a dumping-car, the combination with the car-body, of dumping-gear therefor, a power-cylinder operatively connected with the dumping-gear, and auxiliary hand-operated mechanism for actuating the dumping-gear should the power-cylinder fail, said hand-operated mechanism being adapted to be thrown into or out of connection with the dumping-gear, as required.

3. In a dumping-car, the combination with the main dumping-shaft, of an auxiliary worm-wheel shaft geared thereto, a worm-spindle adapted to be thrown into or out of engagement with the worm-wheel, a friction-drum on the worm-wheel shaft, and a hand-brake coöperating with said friction-drum.

4. In a dumping-car, the combination with the main dumping-shaft, of an auxiliary worm-wheel shaft geared thereto, a worm-spindle adapted to be thrown into or out of engagement with the worm-wheel, a friction-drum on the worm-wheel shaft, and a hand-brake coöperating with said friction-drum, said hand-brake consisting of brake-shoes bearing against opposite sides of the drum and connected by swinging links to an operating-lever.

5. In a dumping-car, the combination with the dumping-shaft, of a drum geared thereto, a power-cylinder, and rigging intermediate of the cylinder and drum, for transmitting motion from the cylinder to the drum and consequently to the dumping-shaft, said rigging consisting of ropes secured at one end to the drum-barrel and at the other end to a fixed point of attachment and passing over pulleys mounted upon the cylinder.

6. In a dumping-car, the combination of a movable cylinder inclosing a fixed piston, pipes for admitting fluid to said cylinder on opposite sides of the piston, and dumping-gear connecting said cylinder to the car-body.

7. In a dumping-car, the combination of a movable cylinder, a fixed piston inclosed by said cylinder, a hollow perforated rod to which said piston is secured, pipes connected to said rod for admitting fluid to said cylinder on opposite sides of said piston, and dumping-gear connecting said cylinder to the car-body.

8. In a dumping-car, a mechanism for rocking the body of said car, consisting essentially of the sliding cylinder containing a fixed piston, means for admitting fluid to said cylinder on each side of said piston, a drum, ropes connected to said drum and to fixed points of attachment on the car and which pass around pulleys secured to said cylinder, and a dumping-shaft having chain connection with the car-body, and a gear connection with said drum.

9. In a dumping-car, the combination of a car-body, a shaft journaled to the car-body and provided with chain-wheels, chains connected to said body and passing over said chain-wheels, a drum geared to said shaft, a sliding cylinder, ropes secured to the car-body and to said drum, and which pass around pulleys secured to said cylinder, a fixed piston within said cylinder, a hollow piston-rod, pipes connecting respectively with the opposite ends of said piston-rod, and a valve for controlling the passage of fluid through said pipes.

10. In a dumping-car, the combination with the releasing-latches for the hinged sides thereof, of friction-rollers mounted to revolve freely in contact with the rear side of the latches.

In testimony whereof I affix my signature in presence of two witnesses.

OTTO C. BAUER.

Witnesses:
T. A. DOOLEY,
H. E. CHANDLER.